Figure 1:
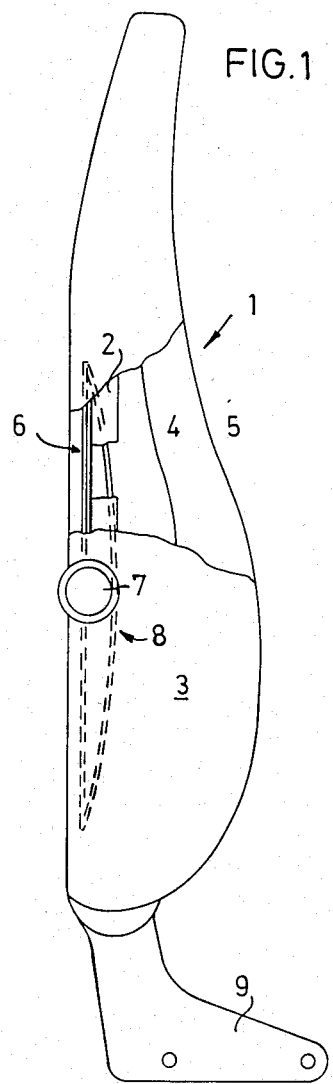

United States Patent [19]

Rönnhult et al.

[11] Patent Number: 4,627,661

[45] Date of Patent: Dec. 9, 1986

[54] CHAIR BACK WITH ADJUSTABLE LUMBAR SUPPORT

[75] Inventors: John Rönnhult, Södertälje; Jan Eklund, Möonsterås, both of Sweden

[73] Assignee: BE - GE Stolindustri AB, Oskarshamn, Sweden

[21] Appl. No.: 634,229

[22] Filed: Jul. 25, 1984

[51] Int. Cl.$^4$ .............................................. A47C 7/46
[52] U.S. Cl. ................................................... 297/284
[58] Field of Search ........................................ 297/284

[56] References Cited

U.S. PATENT DOCUMENTS

| 1,182,854 | 5/1916 | Poler. | |
|---|---|---|---|
| 3,195,955 | 7/1965 | Richardson et al. | |
| 4,316,631 | 2/1982 | Lenz et al. | 297/284 |
| 4,452,485 | 6/1984 | Schuster | 297/284 |

FOREIGN PATENT DOCUMENTS

| 1274003 | 7/1968 | Fed. Rep. of Germany | 297/284 |
|---|---|---|---|
| 2541559 | 3/1977 | Fed. Rep. of Germany. | |
| 2935352 | 3/1980 | Fed. Rep. of Germany | 297/284 |
| 2947472 | 8/1980 | Fed. Rep. of Germany. | |
| 480672 | 9/1916 | France. | |
| 164808 | 9/1958 | Sweden. | |
| 1365348 | 9/1974 | United Kingdom | 297/284 |
| 1536132 | 12/1978 | United Kingdom | 297/284 |
| 2059497 | 4/1981 | United Kingdom | 297/284 |

Primary Examiner—William E. Lyddane
Assistant Examiner—Peter R. Brown
Attorney, Agent, or Firm—Cushman, Darby & Cushman

[57] ABSTRACT

In a chair back for e.g. an automobile seat, a support part suspended in a frame has two elongate side elements along the chair back, which are interconnected by means of connecting members and held tensioned by suspending the side elements in the frame. A tensioning device, connected to both ends of each side element, can subject the side elements to such great buckling forces as to make them arch, with the arch center facing forwards. Thereby a lumbar support is formed wherein the tensioning devices can be actuated by an adjusting means for resetting the lumbar support by changing the size of the arch.

6 Claims, 4 Drawing Figures

CHAIR BACK WITH ADJUSTABLE LUMBAR SUPPORT

The present invention relates to a chair back, and particularly to the back of an automobile seat, of the kind which comprises a support portion suspended in a frame structure and in which two elongated, preferably rod-like side elements extend along the chair back and are connected by means of a plurality of transverse connecting members, which are held tensioned by resiliently suspending each side element in a respective adjacent side part of the frame structure.

A chair back of this design is comfortable, because it adapts well to the shape of the back of the user. Hitherto, however, it has not been possible with this type of chair back to provide an adjustable lumbar support while retaining the good adaptability or conformability of the chair back. A large number of adjustable lumbar supports of mutually different design are known per se, but a common drawback with these known designs is that the lumbar support is felt as a hard bulge which yields but very slightly.

The object of the invention is to eliminate these drawbacks, and to provide an improved chair back having an adjustable, comfortable lumbar support. Another object of the invention is to provide a chair back of simple design.

This is achieved in accordance with the invention, in that each side element is provided with a tensioning device which is connected to both ends of a respective side element; in that the tensioning devices are arranged to subject the side elements to buckling forces of such high magnitude as to cause said side elements to buckle outwardly in the form of an arc, with the centre region of said arc facing outwardly to form a lumbar support; and in that the tensioning devices are arranged to co-act with adjusting means in a manner to permit adjustment of the lumbar support, by altering the magnitude of said buckling force. In this way, it is possible to adjust the lumbar support to the form desired, without it being felt that the support becomes harder as the forward projection of the support is increased.

According to one particularly advantageous embodiment of the invention, the adjusting means includes a rotatable adjusting shaft which is located substantially on the same level as the centre portions of the side elements and which is arranged to co-act with the tensioning devices, said tensioning devices having engagement portions which are in screw-thread engagement with the adjusting shaft in a manner such that when the shaft is rotated, said engagement means are moved in mutually opposite directions therealong. In this way, there is obtained a simple and reliable construction.

Figure 3:
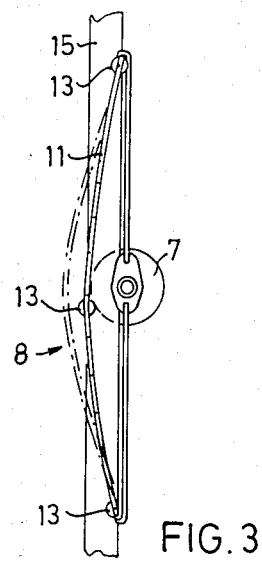
Figure 4:
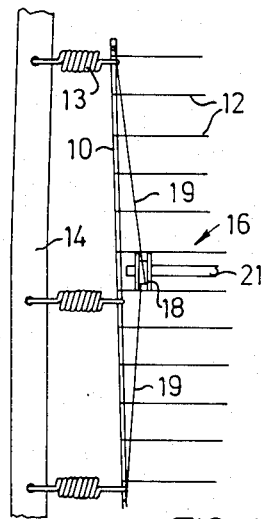
Figure 2:
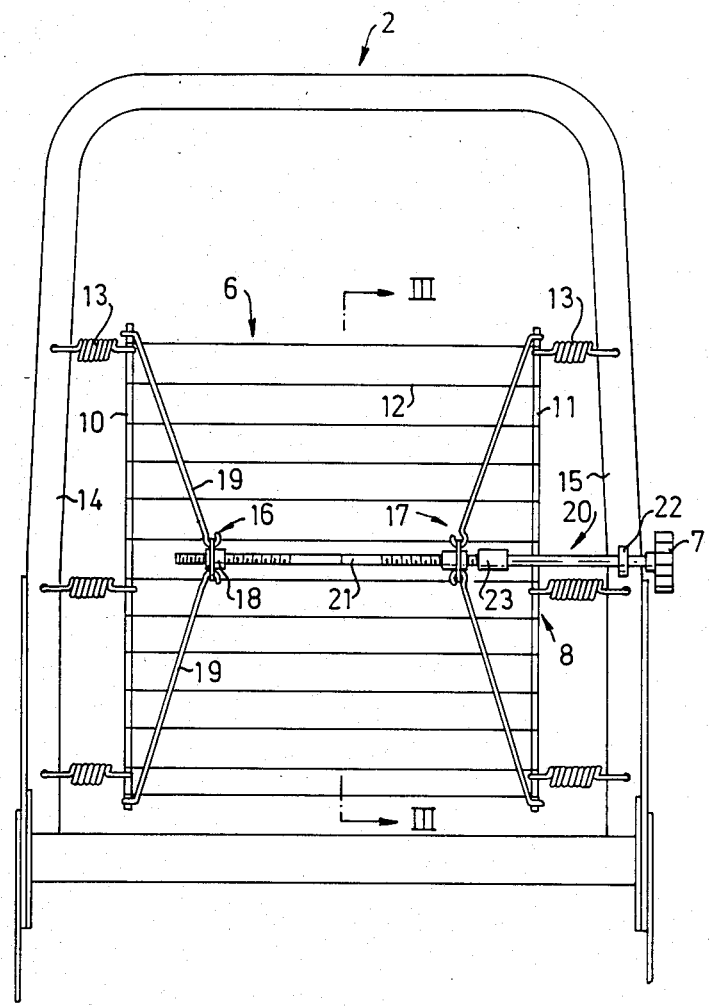

The invention will now be described in more detail, with reference to embodiments thereof illustrated in the accompanying drawings, in which FIG. 1 is a side view, partly in section, of a chair back according to the invention, FIG. 2 is a rear view of the fundamental structure of a chair back according to the invention, FIG. 3 is a sectional view taken on the line III—III in FIG. 2, and FIG. 4 is a part view, corresponding to FIG. 2, of an alternative embodiment of the invention.

In the embodiment illustrated in FIG. 1, a chair back 1 forming part of an automobile seat has a frame structure 2 covered by a moulded body 3. The moulded body 3 has a back-support portion 4, which is located between outwardly projecting side parts, which support the user laterally. In turn, the back-support portion 4 is supported by a support member 6 which is suspended in the frame structure 2 and which forms part of a lumbar support 8, the position of which can be adjusted through a regulating means 7. Arranged at the bottom of the chair back 1 are attachment means 9, for connecting the chair back to the seat-part of a chair.

As shown in FIG. 2, the support member 6 is provided with two elongated, preferably rod-like side elements 10 and 11, which extend along the chair back and which are connected together by means of a number of transverse connecting members 12. Each of the side elements 10 and 11 is resiliently mounted by means of a number of springs 13, in a respective adjacent side part 14 and 15 of the frame structure 2. In this way, the transverse members 12, which may have the form of wires or straps, are placed under tension.

Co-acting with the side element 10 is a tensioning device 16, while a further tensioning device 17 is arranged to co-act with the other side element 11. Each tensioning device includes an engagement means 18 having extending therefrom tensioning member 19, each of said tensioning members being connected to a respective end of the side element. The two tensioning devices 16 and 17 are arranged to subject the side elements 10 and 11 to buckling forces of such high magnitude as to cause the elements to arch outwardly, with the centre region of the arc facing forwards (c.f. FIGS. 1 and 3), so as to form a lumbar support 8 comprising the transverse members 12 extending between the side elements. The tensioning devices 16 and 17 are arranged to co-act with an adjustable tensioning means 20, for changing the extent of the arch formed by the side elements and therewith adjusting the lumbar support (c.f. FIG. 3). The adjusting means 20 includes a rotatable shaft 21, which is located substantially on a level with the centre regions of the side elements and which is in screw-threaded engagement with the engaging means 18 of each tensioning device. The screw threads are such that the two engaging means 18 are moved in opposite directions along the shaft 21, when said shaft is rotated. The regulating means 7 is journalled in a holder 22 on side part 15, and is connected with the adjusting shaft 21 via a twistable connector 23, which permits a certain amount of mutual movement between the regulating means 7 and the adjusting shaft 21. It will be understood that although only one regulating means 7 is shown, the shaft 21 may have such a means on both ends thereof.

Normally, the side elements 10 and 11 are initially pre-arched to a certain extent, and the arch subsequently largened to the extent desired. In this respect, it may be suitable, as illustrated in FIG. 3, to attach the uppermost and lowermost springs to each side of the frame structure on the rear side of the side parts thereof, while attaching the intermediate springs to the front side of said side parts. In the illustrated embodiment, the springs 13 have the form of tension coil-springs, although it will be understood that other types of spring can be used, in suitable numbers.

Another type of tensioning device 16 is illustrated in FIG. 4. In this embodiment, as distinct from what has previously been described, the engaging means 18 is non-rotatably mounted on the adjusting shaft 21. In this case, the tensioning members 19 are so flexible as to be capable of being wound onto and unwound from the engaging means, as the shaft 21 is turned, so as to change the size of the arch. In this embodiment, the engaging means 18 may optionally comprise an actual part of the rotatable shaft 21, and may then suitably be located immediately behind an associated side element. In order to hold the side elements outwardly arched, it is necessary with this embodiment to provide some form of locking means between the holder 22 and the regulating means 7, for example in the form of a friction lock, to prevent accidental rotation of the adjusting shaft 21.

What we claim is:

1. In a seat back having generally upright, spaced-apart side members, a forward face and a back face: two generally upright side elements disposed between said side members, said side elements being of stiff, resilient rod-like construction; transverse tension members connecting each rod-like side element to a respective one of said side members; elongated transverse connecting members connected between said rod-like side elements and maintained in tension by the force of said tension members on said rod-like side elements; a buckling assembly including tensioning members connected to the opposite ends of each rod-like side element for applying thereto buckling forces which cause the respective rod-like side element to arch in a direction such that the center region of the respective rod-like side element moves forward whereby said rod-like side elements and said transverse connecting members form a lumbar support assembly; an adjustable tensioning means supported by said seat back intermediate the ends of the side elements for adjusting said tensioning members in a manner to selectively increase and decrease the buckling forces applied to the opposite ends of said rod-like side elements to thereby change the amount of buckling of said rod-like side elements.

2. A seat back as in claim 1 wherein each tensioning member has opposite ends connected to the ends of the respective rod-like side element said buckling assembly further including engaging members connected to said tensioning members intermediate the ends thereof, each of said engaging members cooperating with said adjustable tensioning means in a manner such that movement of said adjustable tensioning means causes movement of each engaging member in a direction parallel to said transverse connecting members.

3. A seat back as in claim 2 wherein said adjustable tensioning means includes a rotatable adjustment shaft common to and cooperating with said engaging members, said shaft extending generally parallel to said transverse connecting members and being located adjacent the central portions of said rod-like side elements.

4. A seat back as in claim 3 including a rotatable knob and associated shaft, said knob shaft being journalled on one of said side members and being coaxial with and connected to said rotatable adjustment shaft.

5. A seat back as in claim 3 wherein said engaging members are in screw-threaded engagement with said adjusting shaft, the threads causing said engaging members to move in opposite directions along said adjusting shaft upon rotation of said adjusting shaft.

6. A seat back as in claim 1 wherein each tensioning member includes a flexible wire which, intermediate its ends is wound around an engaging member and wherein said adjustable tensioning means includes a rotatable adjusting shaft common to both engaging members and extending generally parallel to said transverse connecting members, said engaging members being non-rotatably mounted on said shaft to enable selective winding and unwinding of said wire upon rotation of said adjusting shaft.

* * * * *